Aug. 16, 1960 G. EGGERS ET AL 2,949,268
AIRCRAFT JET PROPULSION UNIT MOUNT
Filed July 10, 1957 2 Sheets-Sheet 1
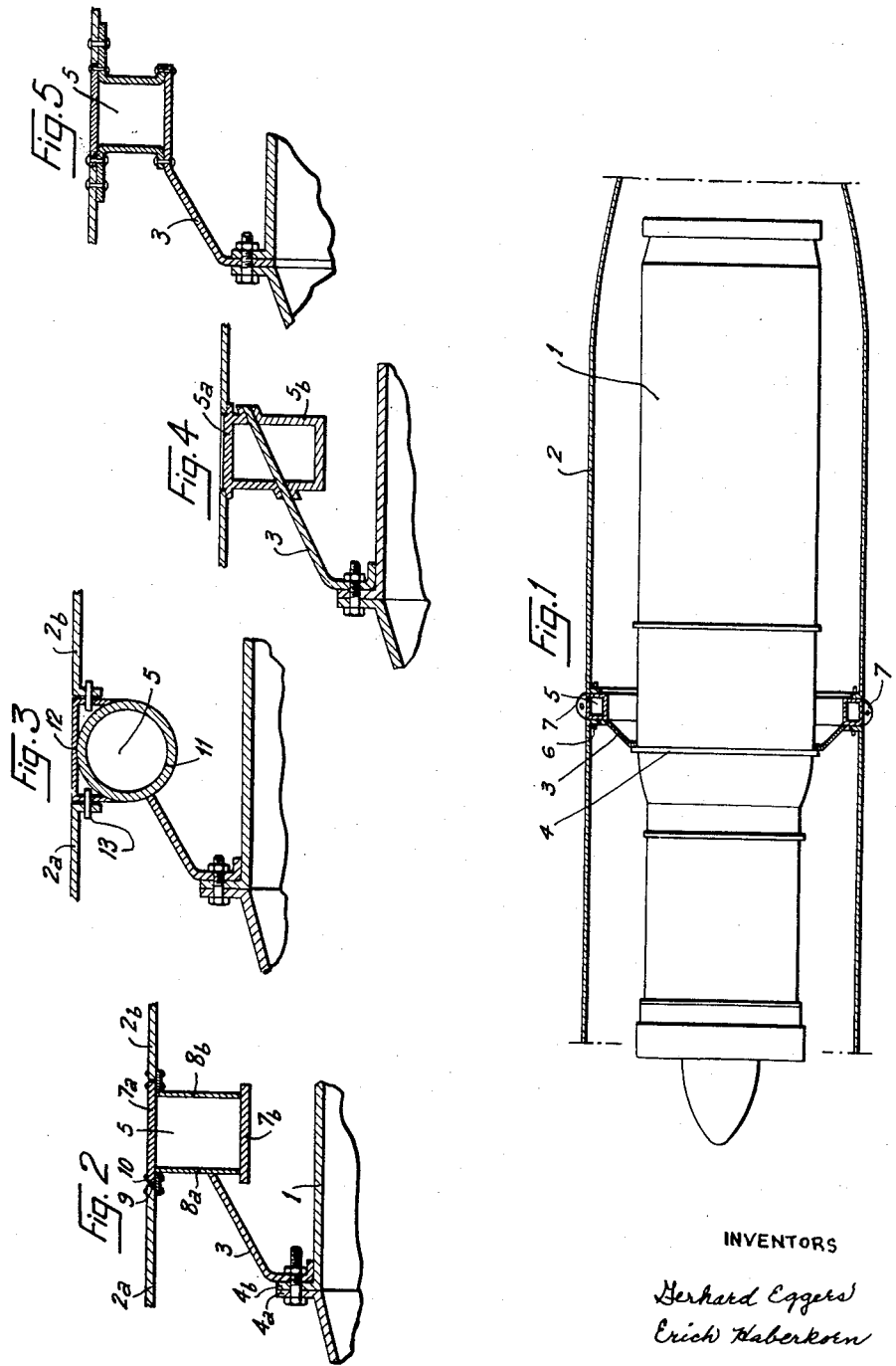
INVENTORS
Gerhard Eggers
Erich Haberkorn
By
Watson, Cole, Grindle & Watson
ATTORNEYS Aug. 16, 1960 G. EGGERS ET AL 2,949,268
AIRCRAFT JET PROPULSION UNIT MOUNT
Filed July 10, 1957 2 Sheets-Sheet 2
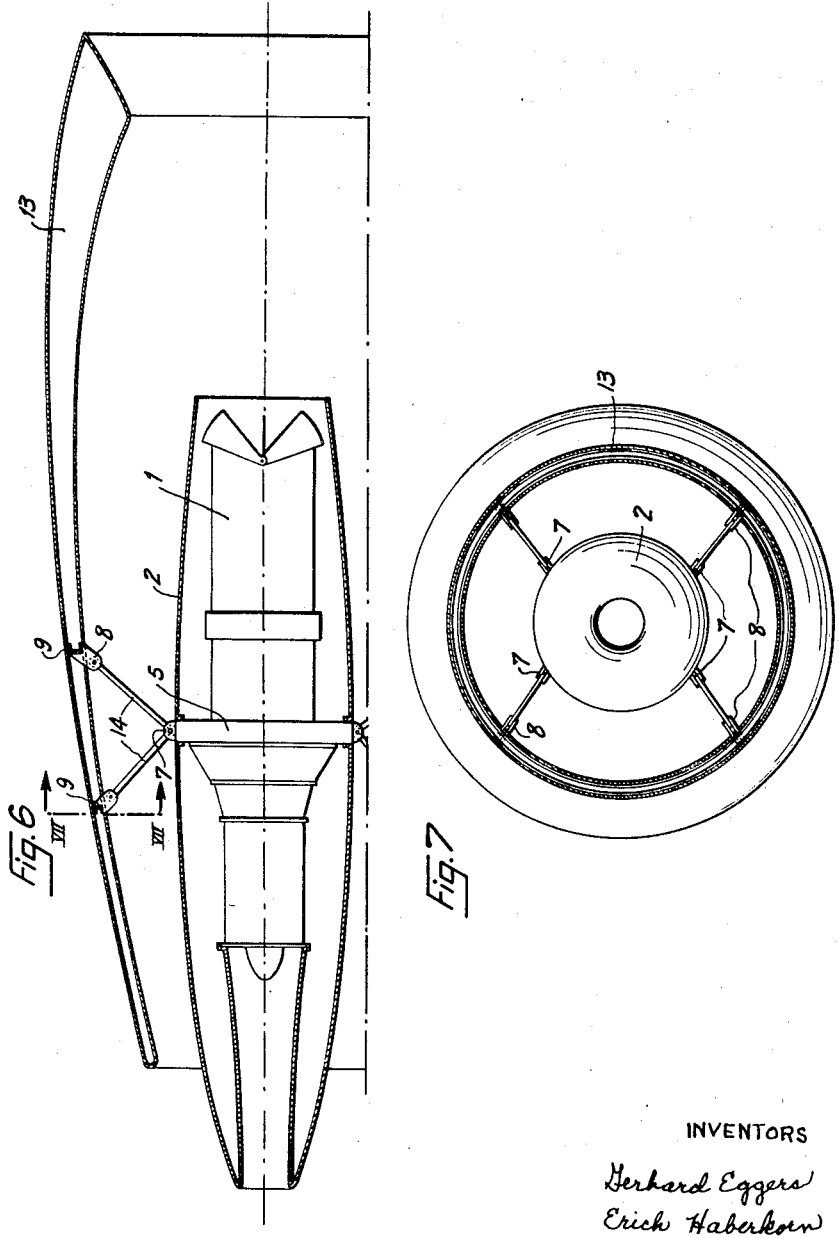
INVENTORS
Gerhard Eggers
Erich Haberkorn
BY
Watson, Cole, Grindle & Watson
ATTORNEYS

United States Patent Office 2,949,268
Patented Aug. 16, 1960

2,949,268
AIRCRAFT JET PROPULSION UNIT MOUNT

Gerhard Eggers and Erich Haberkorn, Dammarie-les-Lys, France, assignors to Société Nationale d'Etude et de Construction de Moteurs d'Aviation, Paris, France, a company of France Filed July 10, 1957, Ser. No. 670,970

Claims priority, application France July 30, 1956

2 Claims. (Cl. 248—5)

The securing of an engine, and especially of a reaction-propulsion unit to the housing or nacelle of an aircraft is usually effected at a limited number of points. For this reason, the forces and stresses, propulsion thrust for example, are concentrated at these points, which may necessitate undesirable local reinforcements. Access to the engine is often awkward and the frontal area of the assembly of the engine with its carrying casing is relatively large.

These drawbacks may be summarised as due to the fact that the engine on the one hand and the nacelle on the other hand are independent assemblies which are separately designed and manufactured.

The present invention enables both the engine and the nacelle which surrounds it to be secured to a single member which provides a coupling not limited to a few points.

In accordance with the invention, by means of an annular sheet metal coupling of flared form, for example in the form of a truncated cone or a pyramid, the engine is rigidly secured to a rigid frame arranged at its periphery, this frame being directly or indirectly coupled to the structure on the aircraft.

This mounting arrangement is especially suitable for turbo-jet units which usually have the general form of an extremely rigid cylindrical body which cannot be incorporated in the general structure of the nacelle, which itself forms a further rigid assembly. The shape of the frame is adapted to that of the turbo-jet unit and is thus usually annular.

The frame itself may be made in many ways, for example by means of metallic members having cross sections of various forms.

When the frame does not form part of the structure proper of the aircraft, it is coupled to it by suitable attachment members fixed to its outer part. The annular coupling has the advantage of having a relative flexibility enabling vibrations to be absorbed to a certain extent, such vibrations being due either to the engine or to the nacelle, and to permit of a uniform peripheral distribution of the stresses produced either by the reaction unit or by the nacelle. The expansion of the engine casing is not interfered with, and conversely, the local deformations of the frame are not transmitted to the engine casing.

The mounting arrangement is of particular advantage in the case of an aircraft with an annular wing. The frame carries the engine and the nacelle constituting the fuselage and it is coupled to the annular wing by radial members fixed for example to annular frames incorporated in that wing.

The description which follows below with reference to the accompanying drawings (which are given by way of example only and not in any sense by way of limitation) will make it quite clear how the invention may be carried into effect, the special features which are brought out, either in the drawings or in the text, being understood to form a part of the said invention.

Fig. 1 shows an example of the mounting of a turbo-jet unit in a cell by means of an arrangement in accordance with the invention.

Figs. 2, 3, 4 and 5 show various modifications of the attachment frames.

Fig. 6 shows in cross-section the combination of a turbo-jet unit provided with a nacelle constituting a cowling, carried by the device in accordance with the invention, and with a ram-jet unit coupled to the turbo-jet unit by attachment members fixed to the annular frame.

Fig. 7 is an end view of the arrangement shown in Fig. 6, with a partial cross-section taken along the line VII—VII.

In Fig. 1 there can be seen a turbo-jet unit 1 mounted inside an aircraft nacelle 2. The coupling between these two members is effected by an annular sheet-metal coupling member 3 in the form of a truncated cone coupled to a flange 4 of the casing of the turbo-jet unit and to an annular frame 5 which is itself connected to the nacelle 2. In the example shown in Fig. 1, the nacelle 2 is in two parts fixed respectively to the frame 5 by attachment members 6, rivets for example.

The frame 5 is situated with respect to the turbojet unit 1 in a section adjacent the centre of gravity of the latter unit in order to reduce to the maximum extent the bending moments imposed on the annular steel sheet 3. At 7 are shown diagrammatically members coupled to the frame 5 and enabling the assembly shown in Fig. 5 to be fixed to another part of the aircraft.

It is of course an advantage if, on the aircraft, the reinforcing or stress-absorbing members, or certain of these members such as spars, ribs, etc., terminate in the frame 5 in order that the stresses caused by the engine and transmitted to this frame by the annular metal sheet 3 are well distributed on the aircraft.

In Fig. 2, there is shown a form of embodiment of the annular frame 5. In this example, the frame has a rectangular section and is formed by two cylindrical strips 7a and 7b assembled to each other by means of two rings 8a and 8b, for example. The coupling member 3 of stamped sheet metal is welded to the ring 8a and it is assembled by screws and nuts to the assembly flanges 4a and 4b of the casing of the turbo-jet unit. The two parts 2a and 2b of the nacelle 2, located on each side of the frame 5 are assembled to the latter by means of intermediate strips 9 and rivets 10.

In the alternative form of construction shown in Fig. 3, the frame 5 is formed by a circular tube 11 completed by a metallic section 12 in the shape of a U welded to this tube, the parts 2a and 2b of the nacelle being fixed by flanges at their extremities to the lateral flanges of the section 12, by means of rivets 13.

In Fig. 4, the annular frame is in two parts 5a and 5b which grip the sheet-metal member 3 between them.

In Fig. 5, the annular sheet-metal member is no longer enclosed in the frame but constitutes a portion of the frame. The latter has again a roughly rectangular section and is formed of metal sections fixed to each other by riveting.

There are again shown in Fig. 6 the members shown in Fig. 1, together with further members, the assembly forming the combination of a turbo-jet unit and a ram-jet unit.

The nacelle 2 constituting the cowling of the turbo-jet unit is arranged in the interior of the casing 13 of the ram-jet unit, which is shown diagrammatically. The coupling between these two parts is effected by means of bars 14 articulated to the fixing arms 7 carried by the frame 5 and to fixing arms 8 fixed to annular beams 9 forming part of the structure of the casing of the ram-jet unit.

The annular sheet-metal coupling 3, generally produced by punching or stamping, may be fluid-tight and may form in this case a fire-proof partition in which there may be pierced openings which permit of a circulation of air around the engine casing. It may also be reinforced either by built-on metal sections or by ribs obtained by stamping or punching, and lends itself furthermore to many other alternative forms of construction.

The frame and the sheet-metal coupling may be adapted to any desired shape of engine, or to any combination of engines, for example that formed by twin engines, the coupling then having a suitable form so as to be connected to the casings of the two engines, over at least one part of the periphery of each of the casings.

By way of a still further alternative form, the orientation of the annular coupling of flared form may be reversed, that is to say that, for example if the case of Fig. 1 is considered, the coupling 3 instead of having its divergent portion turned towards the rear of the propulsion unit (towards the right-hand side of the drawing) may be arranged so that its divergent face turns towards the front of the propulsion unit (towards the left-hand side of the drawing).

It will of course be understood that modification may be made to the forms of embodiment which have just been described, in particular by the substitution of equivalent technical means, without thereby departing from the spirit or from the scope of the present invention.

What we claim is:

1. A structure for mounting an aircraft jet propulsion unit comprising a nacelle of generally cylindrical shape enclosing the same, a substantially rigid frame in the form of a hollow tore-shaped member of revolution around the axis of said unit, said rigid frame being rigidly secured along its outer periphery to said nacelle at an intermediate section thereof and extending around and at a distance from said unit, and a sheet-metal annular flange of generally frusto-conical shape, secured along its outer periphery to said frame and along its inner periphery to said unit.

2. Structure as claimed in claim 1 wherein the nacelle comprises two separate portions which are rigidly interconnected through the frame and which extend fore and aft of said frame.

References Cited in the file of this patent
UNITED STATES PATENTS

| | | |
|---|---|---|
| 2,377,006 | Heinemann | May 29, 1945 |
| 2,422,397 | Dean | June 17, 1947 |
| 2,687,860 | McNitt | Aug. 31, 1954 |
| 2,722,801 | Lombard | Nov. 8, 1955 |
| 2,863,620 | Vautier | Dec. 9, 1958 |